United States Patent [19]
Boero et al.

[11] Patent Number: 5,150,516
[45] Date of Patent: Sep. 29, 1992

[54] PROCESS FOR MAKING DETACHABLE CONNECTING MEANS FOR RIBBON OPTICAL FIBER CABLES AND THE CONNECTING MEANS OBTAINED THEREBY

[75] Inventors: Paolo Boero, Milan; Bruno Bortolin, Cinisello Balsamo, both of Italy

[73] Assignee: Societa' Cavi Pirelli S.p.A., Milan, Italy

[21] Appl. No.: 580,590

[22] Filed: Sep. 11, 1990

Related U.S. Application Data

[63] Continuation-in-part of Ser. No. 555,907, Jul. 20, 1990, Pat. No. 5,037,179.

[30] Foreign Application Priority Data

Sep. 28, 1989 [IT] Italy ................................ 21866 A/89

[51] Int. Cl.$^5$ ...................... H01R 43/00; B21D 35/00
[52] U.S. Cl. ........................................ 29/877; 29/412; 29/469.5; 29/869; 72/412
[58] Field of Search .................. 29/412, 469.5, 877, 29/882, 884, DIG. 19, DIG. 26, DIG. 37, DIG. 55, 868, 869; 51/91 R, 92 R, 92 ND, 281 R, 326, 327; 72/412, 415, 469; 350/96.20, 96.21

[56] References Cited

U.S. PATENT DOCUMENTS

| | | | |
|---|---|---|---|
| 4,411,147 | 10/1983 | Capuano | 72/469 X |
| 4,818,058 | 4/1989 | Bonanni | 350/96.2 |
| 4,818,059 | 4/1989 | Kakii et al. | 350/96.2 X |

FOREIGN PATENT DOCUMENTS 14425 1/1982 Japan ........................................ 72/412

Primary Examiner—Joseph M. Gorski
Assistant Examiner—Peter Dungba Vo
Attorney, Agent, or Firm—Brooks Haidt Haffner & Delahunty

[57] ABSTRACT

Connectors for optical cables in ribbon form and a process for making such connectors in which metal plates for the enclosing the cable ends are made by cold, plastic flow forming of grooves in the plates with a punch having ridges produced by a process which produces grooves which hold the positions of the optical fibers between the plates within narrow tolerances. In the process, a punch body with partially formed ridges is mounted on a head rotatable about the axis of the body and movable toward a grinding wheel which is movable in a path perpendicular to the direction of movement of the head toward the grinding wheel. After two opposite passes of the grinding wheel along the side of a ridge, the punch body is rotated 180 degrees, and the side of a corresponding ridge on the opposite side of the punch body axis is ground. The process is repeated with movement of the head toward the grinding wheel, which is measured, until the sides of all ridges are ground. One of the grooves receives an alignment pin, and after the fibers are assembled with the plates, the end faces of the fibers are ground.

7 Claims, 3 Drawing Sheets

PROCESS FOR MAKING DETACHABLE CONNECTING MEANS FOR RIBBON OPTICAL FIBER CABLES AND THE CONNECTING MEANS OBTAINED THEREBY

RELATED APPLICATION

This application is a continuation in part of copending application Ser. No. 555,907, filed Jul. 20, 1990, now U.S. Pat. No. 5,037,179 entitled "Interconnect System for Coupling Ribbon Optical Fibers and Method for Making the Same", and assigned to the assignee of the present application, the disclosure of which is incorporated herein by reference.

FIELD OF THE INVENTION

The present invention relates to a connecting means for interconnecting optical fibers disposed in a ribbon and to a process for making such connecting means.

BACKGROUND OF THE INVENTION

In order to connect two optical cables of the "ribbon type" to each other, that is, cables in which several optical fibers are disposed in parallel to each other and united together by a single plastic coating so as to form a ribbon and one or more ribbons are joined to form the cable, it is necessary to arrange each optical fiber of a ribbon forming one cable in alignment with the corresponding fiber of a ribbon forming the other cable so as to allow light to pass from one fiber to the other while minimizing dispersion and attenuation of the transmitted signal resulting from faults in the fiber alignment.

For the purpose of achieving such alignment simultaneously in all fibers forming the ribbon, the end of the ribbon itself is conveniently fitted into a rigid body, named a "connector", which keeps the fibers in a geometrically definite position. Two connectors forming a pair are, therefore, arranged and held in a confronting relationship and aligned in order to form a connecting means so that the respective fibers can be constrained to the correct position for forming the optical connection.

Due to the requirements for a connection in which the best alignment between all the fibers of the ribbon is achieved so as to limit the attenuation of the light signal to the minimum when passing through the connection, it is necessary to provide very reduced tolerances as regards possible faults in coaxial alignment between the fibers of each interconnected pair and, as a result, very reduced tolerances in the sizes and positions of the housings for the fibers themselves in the connectors. In particular, by way of example, for connecting ribbons made of single-mode fibers in which the diameter $\phi$ of the cladding of each fiber is 125 micrometers and the mode diameter is equal to 9.5 micrometers, the position fault of the axis of a fiber in a connector with respect to the axis of the corresponding fiber in the facing connector, must not be higher than one micrometer, so that in most cases the signal attenuation at the connection may be lower than 1 dB which is deemed to be the maximum permissible loss value in the connection.

To make connectors meeting these accuracy requirements is quite a delicate operation, taking particularly into account the fact that it is necessary to produce a great number of connectors to be matched while ensuring the same qualitative alignment value for all of them.

For such purpose, connectors are known in which the optical fibers are housed within the grooves of a plate made of crystalline material which are obtained with several steps by localised etching at positions defined by protection templates.

Therefore, in order to achieve the very high accuracy in size required for the housing grooves in a plate, the position and shape of which directly defines the axis position of the fiber contained therein, particularly delicate and expensive working processes are required in producing said plates.

Grooved plates can also be made using a metallic material by cold plastic deformation or coining. Such working ensures a precise reproduction of the features of the punch or die used, and therefore, the achievement of the desired accuracy level is bound to the manufacturing accuracy 25 of the punch itself.

However, common mechanical precision operations, such as grinding, do not ensure the required reduced tolerances while, on the other hand, operations checked by optical instruments and the like, which are adapted to permit size differences smaller than the range of the required precision to be detected, are very expensive if applied to the entire workpiece manufacture.

BRIEF SUMMARY OF THE INVENTION

Therefore, the present invention has, as one object, the providing of a process for making a punch or die having size accuracy and tolerances adapted for use in forming connector plates for joined optical fibers in ribbon cables by cold plastic deformation which process involves relatively reduced costs as far as mechanical operations are concerned.

An object of the present invention is a process for making interchangeable connectors for cables consisting of optical fibers ribbon cables, each connector being mounted at one end of a respective optical fiber ribbon formed of at least two parallel optical fibers enclosed in a single outer coating and being provided with a coupling face in contact with the corresponding face of another connector, the fibers being in alignment with each other and the ends of which are at the coupling face, characterised in that, a punch or die having several parallel ridges of dihedral form is manufactured by mechanical working which comprises at least a grinding step for the parallel ridges in which corresponding ridges are worked in succession by rotating the punch or die about its longitudinal axis. Several plates of metallic material having respective grooves corresponding to the punch ridges are cold pressed by plastic deformation. The fibers of an optical fiber ribbon are clamped between two plates, at least one of which is manufactured by means of the punch. A hardening adhesive material is inserted between the plates to hold them together, the end surfaces of the fibers are ground and at least an alignment plug is introduced into a corresponding aperture defined by at least a groove of a grooved plate.

In greater detail, the punch or die is made by first forming, by medium precision mechanical working, a partially-formed impression surface having several raised ridges in register with the desired position for the grooved plate grooves, then fastening the punch itself to the rotatable spindle of an angular precision index head mounted on one slide horizontally movable along a rectilinear guide perpendicular to a translation guide for the displacement of a second slide carrying a shaped-disc grinding machine, and thereafter performing the following steps:

grinding one side of a punch ridge by a first displacement or pass of the slide carrying the grinding machine;

rotating the angular index head carrying the punch through 180 degrees, while keeping its position steady along the translation guide and then, by a translation of the slide carrying the grinding machine, grinding the side of the punch ridge symmetrical to the preceding one with respect to a plane passing through the axis of rotation of the angular index head;

translating the slide carrying the angular index head towards the grinding machine by a predetermined working feed amount and repeating the preceding workings until the nominal distance of the two corresponding ridge sides of the punch has been achieved;

repeating the same operations for one side of all the punch ridges;

detecting, through optical detection means, the position of one ridge side and grinding the opposite ridge side at a predetermined distance with respect to the detected side;

grinding the corresponding side of the symmetrical ridge with respect to the plane passing through the axis of rotation of the index while keeping the slide carrying the index head stationary and rotating the index head through 180 degrees; and repeating the optical detection and grinding operations for the remaining sides of the punch ridges.

A further object of the present invention is to provide a punch or die for making metal plates by plastic deformation for interchangeable connectors for cables of optical fibers in a ribbon characterized in that the punch or die has an impression surface having several parallel ridges designed to form corresponding grooves in the metal plates formed by said punch, which grooves are adapted to house one or more optical fibers and at least an alignment plug, wherein the ridges are symmetrical to a plane passing through the longitudinal axis of the punch and which punch is manufactured in accordance with the above described process.

A still further object of the present invention is an interchangeable connector for cables consisting of optical fibers joined in a ribbon characterized in that, the connector comprises at least a grooved plate wherein the grooves are adapted to house one or more optical fibers and at least an alignment plug and the grooves are symmetrical with respect to a middle plane of the plate, the plate being formed by plastic deformation with a punch manufactured by means of the above described process.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF THE INVENTION

Figure 1:
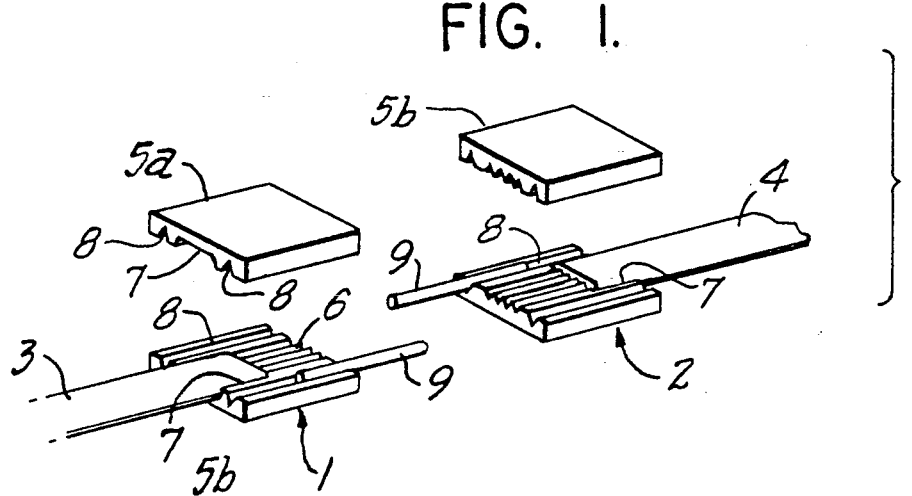
FIG. 1 is an exploded view of a pair of connectors for interconnecting optical fibers joined in a ribbon.

As shown in FIG. 1, the connection of two optical fiber ribbons is carried out by means of a pair of connectors 1, 2, secured to the corresponding ends of optical fiber ribbons 3, 4, arranged in facing relationship.

Each connector, shown in an exploded view in FIG. 1, consists of a pair of plates 5a and 5b at least one of which is provided with longitudinal grooves 6 into which the end portion of the optical fibers of the ribbons 3, 4 are disposed after being stripped, over a length thereof, of their protective coating made of plastic material so that their cladding is exposed. A recess 7, formed at the end of the plates 5a and 5b, allows the end portion of the plastics coating, which is greater in thickness than the fibers, to be accommodated. FIG. 1 illustrates, for the ribbon 3, two different plates 5a and 5b, the plate 5a not having the grooves 6, and two of the same plates 5b for the ribbon 4. However, both connectors may be the same, i.e., both connectors may have either two different plates 5a and 5b or two of the same plates 5b. The grooves 8 in the plate 5a are formed in the same manner as the grooves 8 of the plate 5b described hereinafter.

A pair of further longitudinal grooves 8 receives the alignment plugs or pins 9, preferably one for each connector, designed to enter the corresponding grooves of the other connector and through which the connectors are matched, the alignment condition of the connection being also determined by them.

In order to achieve the correct alignment of the fibers with the desired accuracy so as to reduce the attenuation of the signal in the connection as much as possible (at least below 1 dB), the plate grooves determining the position of the fibers and the alignment plugs are made by plastic deformation of the plate material by cold pressing or coining.

Figure 2:
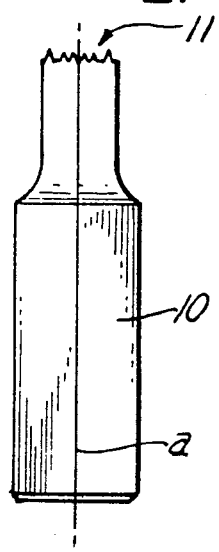
FIG. 2 is a side view of a punch or die to make grooved plates for the connectors shown in FIG. 1.
Figure 3:
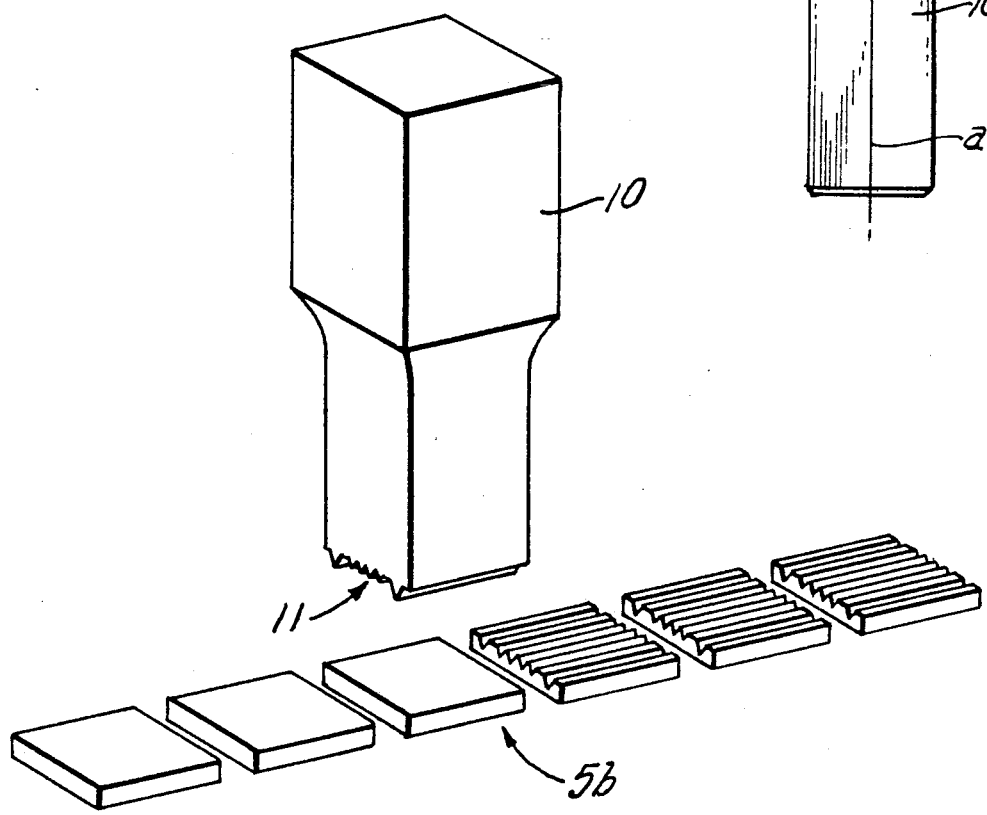
FIG. 3 is a diagrammatic showing the process for the formation of the grooved plates by the use of the punch shown in FIG. 2.

As shown in FIGS. 2 and 3, the plates 5b are pressed or coined by the use of a punch or die 10 having a working area or face 11, and therefore, the plates 5b are identical with one another. In a subsequent step, the formation of the recess 7 takes place, and for the formation of recess 7 tolerances of normal mechanical working are permissible.

Figure 5:
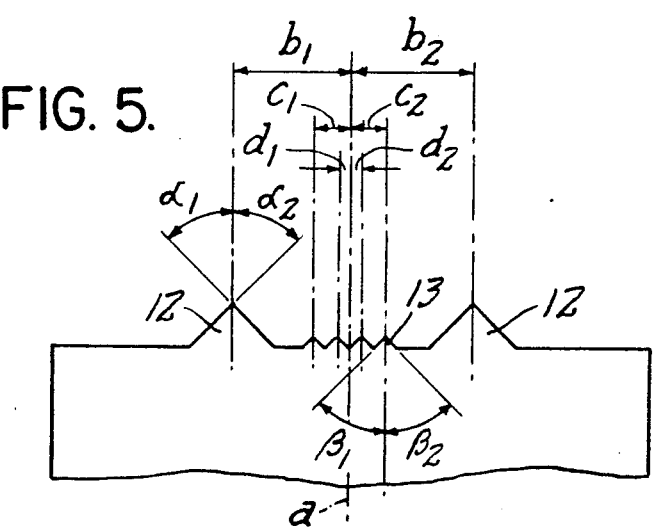
FIG. 5 is an enlarged side view of the punch illustrating the profile of the impression surface of the punch.

In order to create the working area 11 of the punch 10 exhibiting, as shown in FIG. 5, a pair of ridges 12 designed to form grooves 8 and several ridges 13 designed to form grooves 6, a precision grinding is carried out which ensures the symmetry of the punch itself with a plane passing through its longitudinal axis a. This means that distances $b_1$ and $b_2$, $c_1$ and $c_2$, $d_1$ and $d_2$ are, respectively, strictly equal to each other, that is to say, that the tolerance for the equality between said distances is within very small limits. The same considerations also apply to the angles $\alpha_1$ and $\alpha_2$, $\beta_1$ and $\beta_2$ of the dihedrals forming the ridges 12 and 13 which are respectively equal to each other with the same accuracy. Preferably, angles $\alpha$ and $\beta$ are identical.

Figure 4:
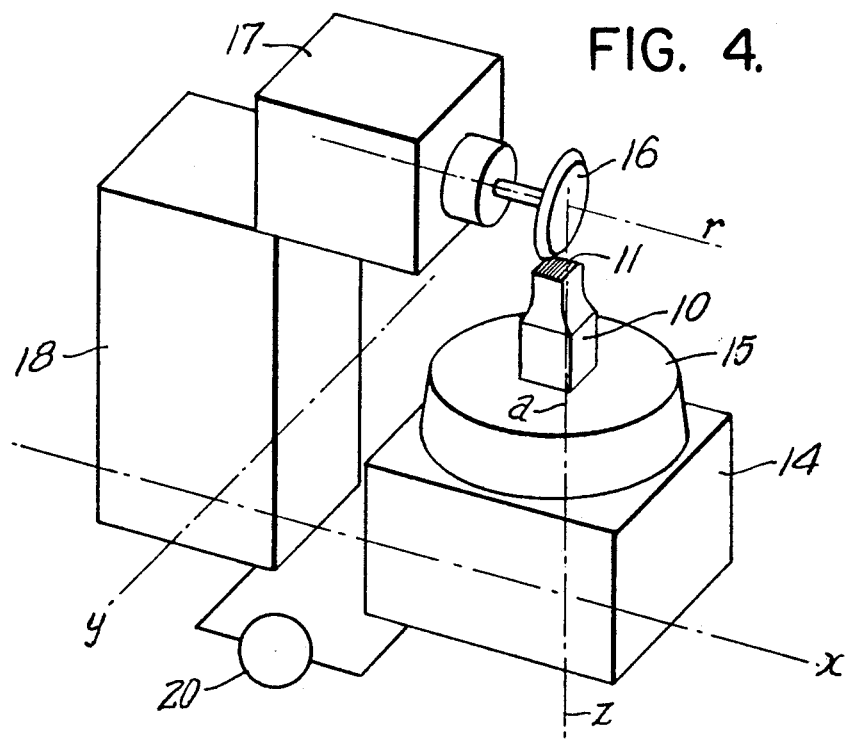
FIG. 4 is a diagrammatic showing of the apparatus used to make the punch shown in FIGS. 2 and 3.

For the purpose of providing such precision, use is made of an arrangement of a machine of the type illustrated diagramatically in FIG. 4. Such machine comprises a support slide 14 movable by a translation movement in the horizontal plane according to the direction shown by axis x in FIG. 4 and carrying an angular index head 15 having a vertical rotation axis z.

The punch 10 is secured to the work spindle of the index head 15 in a conventional manner, its axis a being coincident with the axis of rotation z of the index head 15.

A grinding wheel 16 having an angled peripheral profile is supported and rotatable by a grinding head 17, the axis of rotation r of which is horizontal and parallel to axis x. The grinding head 17 is carried by a support slide 18 movable in the horizontal plane along axis y, perpendicular to the axis x.

Either the grinding head 17 or the slide 14, or both, is vertically adjustable in the direction of axis z.

The precision of the planes in which the axes x, y, z, a and r lie must be met according to the tolerances typical of precision machines.

Figure 6:
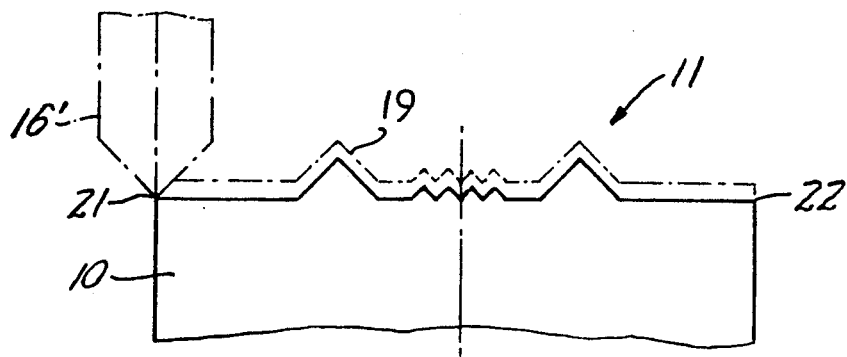
FIG. 6-9 are diagrammatic showing of the forming of the punch and profile.

Punch 10 is first worked using ordinary machine tools of the medium precision type, that is, exhibiting a precision in the range of $\pm 1/10$ of millimeter, thus forming the profile 19 shown in the dot-dash line in FIG. 6 on its working area 11. Such profile 19 substantially corresponds to the ultimate desired profile shown in solid line in FIG. 6 leaving a machining allowance to be removed by grinding, which has been magnified in FIG. 6 for the sake of clarity.

The quantity of material to be removed by grinding will therefore be within reduced limits which will bring about insignificant values of wear of the grinding wheel 16 during working.

Thereafter, the punch 10 is mounted on the index head 15 so that its axis is coincident with the axis of rotation z of the index head and the ridges of the profile 19 are parallel to the axis of horizontal translation y of the grinding head 17.

A comparator 20 adapted to ensure a measurement of a precision in the range of $\pm 1/100$ of millimeter is associated with the slide 14 movable along axis x and carrying the angular index head 15, and the comparator 20 executes the measurement of the translation of the slide 14 relative to the slide 18 carrying the grinding head 17.

When starting the grinding, the slide 14 is disposed so that the action line of the profile apex of the grinding wheel 16 is brought into register with a side edge 21 of the punch 10, as shown in dot-dash lines in FIG. 6 and designated by reference numeral 16', and the comparator 20 is set to zero at this position.

Then, the grinding of the working area 11 along the edge 21 is carried out while the slide 18 performs an alternate translation along axis y. When the first pass is over, the index head 15 is rotated through 180 degrees and the operation is repeated along the opposite edge 22 of the punch 10 while keeping the same position of the index head 15 along axis x.

Figure 7:
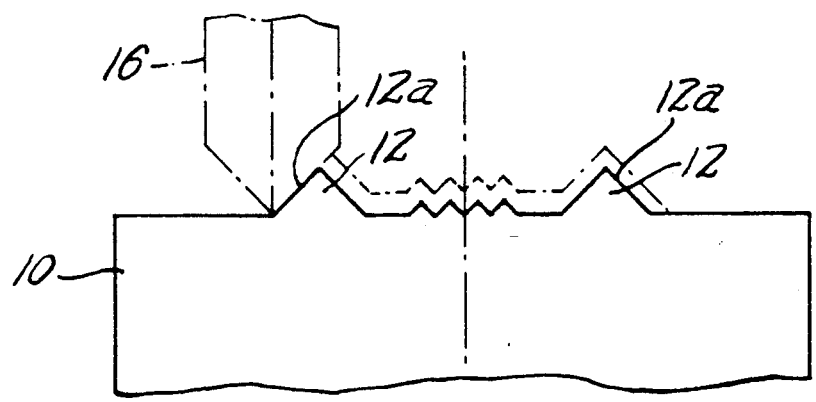

The operation is repeated several times by rotating the index head 15 at each pass and moving the slide 14 each time towards the slide 18 until the comparator 20 detects that the nominal distance of the side of ridges 12 has been reached. In this way, as shown in FIGS. 7, 8, the corresponding outer sides 12a of the ridges 12 are worked under conditions of complete symmetry with respect to a plane passing through the axis a of the punch 10 which is coincident with the axis of rotation of the index head 15.

During the whole operation, the distance of the working area of the grinding wheel 16 from the axis z is kept constant.

The position of the surfaces 12a with respect to their nominal planned distance is given by the exactness of comparator 20 without further precision requirements.

Figure 8:
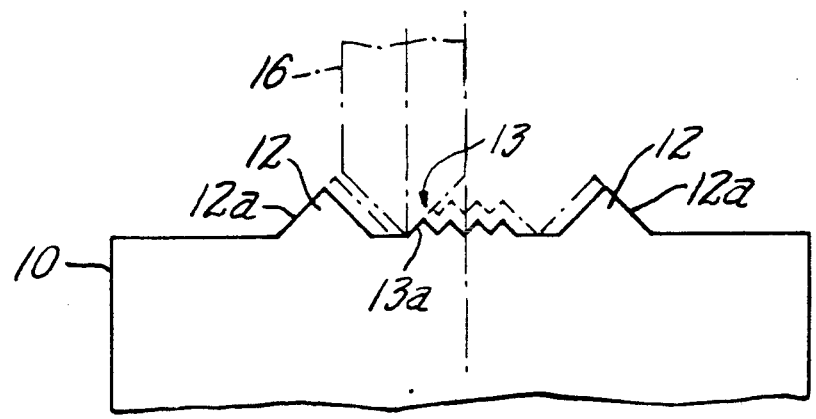
Figure 9:
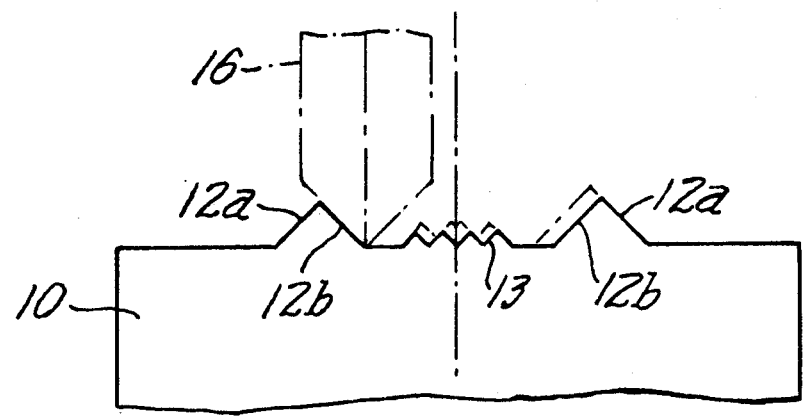

Subsequently, by the same procedure, as shown in FIG. 8, the outer sides 13a of ridges 13 are worked symmetrically relative to axis a thereby obtaining the outer sides of ridges 12 and 13 in which the spacing accuracy is given by the described equipment, and therefore, the tolerance can even be higher than the permitted values for achieving the alignment between the fibers of two faced connectors. In any event, said values are strictly symmetrical with respect to the axis a itself.

Through highly precise optical alignment means, the grinding wheel 16 is then arranged so that it can perform the grinding of the surface 12b of ridges 12 while respecting, with reference to surface 12a, the correct outline of the ridge itself, the index head 15 being rotated through 180 degrees after each double pass. As a result both ridges 12 have a precise profile which will be obtained by the optical checking carried out and which will be equal to each other by virtue of the above-described rotation of the index head 15. In an identical manner, that is by optically aligning the grinding wheel relative to a side 13a which has been already ground, of each pair of ridges 13 symmetrical with axis a, sides 13b of all ridges 13 are formed thereby completing the working area of the punch.

Then, the impression surface of the punch 10 can be submitted to a surface treatment increasing the hardness thereof so as to prolong its lifetime in use.

By the use of a punch 10, made as described, the connector plates 5 are identical with one another as regards positions and sizes of grooves 6 and 8 and can therefore be freely matched, ensuring high accuracy levels in the alignment between the optical fibers housed in the groovers themselves.

As described hereinbefore, the fibers of a ribbon, stripped of the ribbon material is assembled with a plate 5b with the optical fibers in the grooves 6 and a portion of the ribbon in the recess 7. The end faces of the fibers are at the face of the plate 5a or 5b, and a second plate either another plate 5a or 5b or a plate which will hold the fibers in the grooves 6 is applied over the first plate 5a or 5b with an adhesive between the plates to hold them together. After the adhesive hardens, the end faces of the fibers are ground. An alignment plug 9 is inserted in the groove 8 either before or after the plates are assembled.

Although preferred embodiments of the present invention have been described and illustrated, it will be apparent to those skilled in the art that various modifications may be made without departing from the principles of the invention.

Embodiments of the invention in which an exclusive property or privilege is claimed are defined as follows:

1. A process for making a connector for connecting optical fibers of a ribbon cable having a number of longitudinally extending, parallel optical fibers greater than one therein to optical fibers of a like cable, said connector being interchangeable with and connectible to another like connector and having a pair of opposed metal plates, at least one of said plates having a face facing a face of the other of said plates and having a plurality of parallel grooves therein at least equal in number to the number of optical fibers to be interconnected, said process comprising:

providing a punch body with a punch face having a plurality of parallel ridges which are dihedral in cross-section and which correspond to said grooves, said punch body having a longitudinal axis perpendicular to said punch face and said ridges being symmetrically disposed with respect to a plane co-incident with said longitudinal axis, said ridges being formed, at least in part, by grinding said punch face in successive passes with relative movement of a grinding means and said punch face parallel to said ridges and intermediate one or more passes by rotating said punch face around said longitudinal axis; and forming said grooves in at least said one of said plates by pressing said punch face against said face of said one plate and causing plastic flow of the metal of said one plate corresponding to said grooves;

whereby said grooves formed in said metal plates correspond to said ridges of said punch face.

2. A process as set forth in claim 1 wherein said punch face is formed with at least one ridge extending higher from said punch face than others of said ridges for forming a groove in said one of said plates for receiving an alignment pin.

3. A process for making a connector for connecting optical fibers of a ribbon cable having a number of longitudinally extending, parallel optical fibers greater than one therein to optical fibers of a like cable, said connector being interchangeable with and connectible to another like connector and having a pair of opposed metal plates, at least one of said plates having a face facing a face of the other of said plates and having a plurality of parallel grooves therein at least equal in number to the number of optical fibers to be interconnected, said process comprising:

providing a punch body with a punch face having a plurality of parallel ridges which are dihedral in cross-section and which correspond to said grooves, said punch body having a longitudinal axis perpendicular to said punch face and said ridges being symmetrically disposed with respect to a plane co-incident with said longitudinal axis, said ridges being only partially formed by mechanical working, after said ridges are partially formed, said punch body is mounted on a first support adjacent a grinding wheel mounted on a second support, said first support being rotatable around an axis of rotation and said punch body being mounted on said first support with its said longitudinal axis co-incident with said axis of rotation and said first support also being mounted for rectilinear translation in the direction toward said second support, said second support being mounted for rectilinear translation in a direction perpendicular to said direction of translation of said first support and said punch body being mounted on said first support with said ridges which are partially formed extending parallel to said direction of translation of said second support;

grinding one side of a first of said partially formed ridges while causing a first translation of said second support in said direction of translation thereof;

after said first translation of said second support, rotating said first support around said axis of rotation by 180 degrees, and grinding the side of a second one of said partially formed ridge which is substantially equidistant from said longitudinal axis as the last-mentioned one side of one of said partially formed ridges while causing a second translation of said support;

translating said first support toward said second support by a predetermined amount and repeating the grinding operations, while measuring the distance between the sides being ground, until the distance between the ground sides is equal to the desired value; and similarly grinding the opposite sides of said first one of said ridges and of said second one of said ridges; and forming said grooves in at least said one of said plates by pressing said punch face against said face of said one plate and causing plastic flow of the metal of said one plate corresponding to said grooves;

whereby said grooves formed in said metal plates correspond to said ridges of said punch face.

4. A process as set forth in claim 3, wherein said punch face has at least four ridges thereon and wherein the sides of all said ridges are ground by said grinding operations.

5. A process for making a connector for connecting optical fibers of a ribbon cable having a number of longitudinally extending, parallel optical fibers greater than one therein and which are covered by a protective material to optical fibers of a like cable, said connector being interchangeable with and connectible to another like connector and having a pair of opposed metal plates, at least one of said plates having a face facing a face of the other of said plates and having a plurality of parallel grooves therein at least equal in number to the number of optical fibers to be interconnected, said process comprising:

providing a punch body with a punch face having a plurality of parallel ridges which are dihedral in cross-section and which correspond to said grooves, said punch body having a longitudinal axis perpendicular to said punch face and said ridges being symmetrically disposed with respect to a plate co-incident with said longitudinal axis, said ridges being formed, at least in part, by grinding said punch face in successive passes with relative movement of a grinding means and said punch face parallel to said ridges and intermediate one or more passes by rotating said punch body around said longitudinal axis;

forming said grooves in at least said one of said plates by pressing said punch face against said face of said one plate and causing plastic flow of the metal of said one plate corresponding to said grooves, whereby said grooves formed in said metal plates correspond to said ridges of said punch face;

removing the protective material from end portions of said fibers;

inserting said end portions of said optical fibers in grooves in said one plate with end faces thereof at an end of said one plate;

securing the other of said plates to said one plate with said end portions between said plates; and grinding said end faces of said optical fibers.

6. A process as set forth in claim 5 wherein said other of said plates is secured to said one of said plates by an adhesive.

7. A process as set forth in claim 5 further comprising inserting an alignment pin in one of said grooves with an end portion of said pin extending from an end of said plates.

* * * * *